Patented Aug. 9, 1932

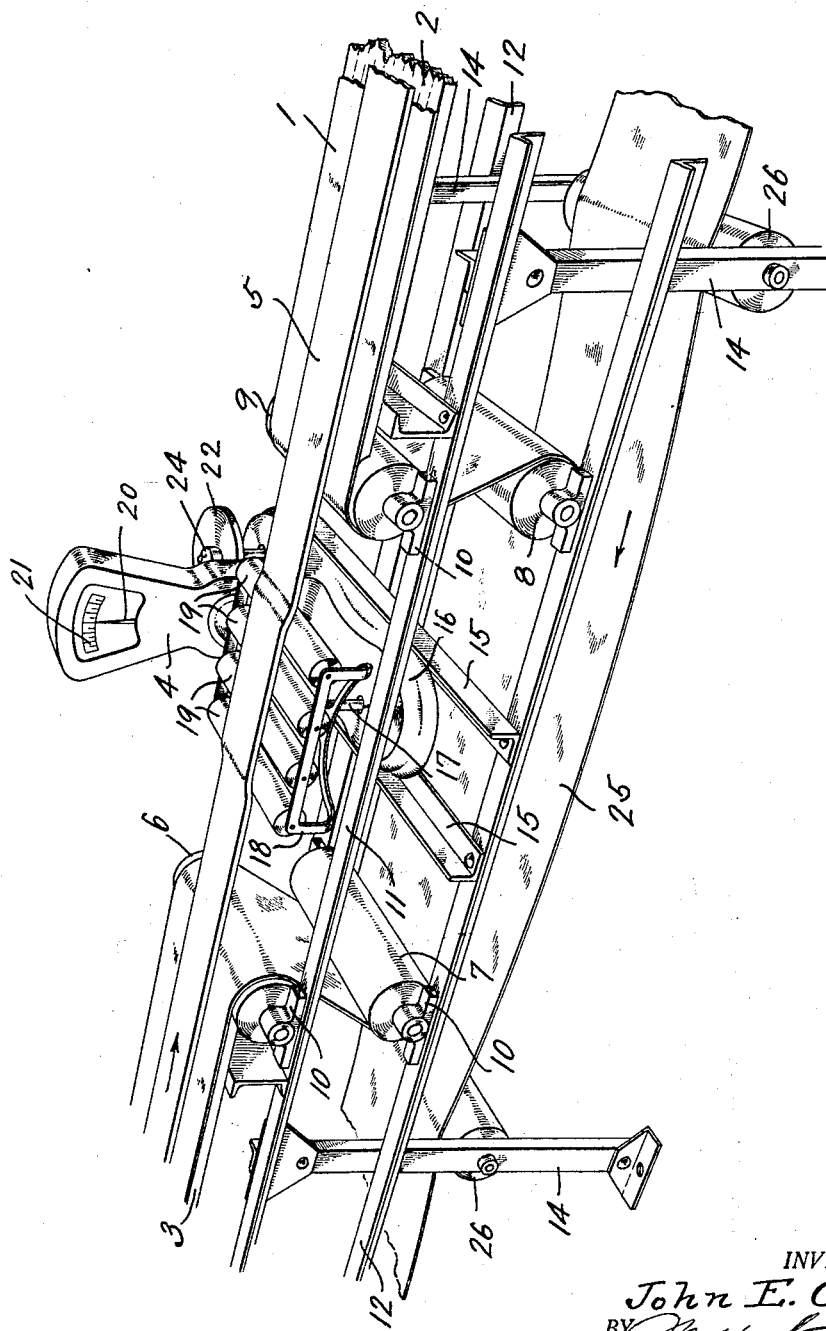

1,871,039

UNITED STATES PATENT OFFICE

JOHN E. CADY, OF INDIANAPOLIS, INDIANA, ASSIGNOR TO G & J TIRE COMPANY, OF INDIANAPOLIS, INDIANA, A CORPORATION OF INDIANA

APPARATUS FOR CONTINUOUSLY WEIGHING STRIP MATERIAL

Application filed May 2, 1930. Serial No. 449,345.

My invention relates to apparatus for continuously weighing strip material, and more particularly to apparatus for continuously determining the lineal weight of such material.

For many purposes it is desired to continuously weigh flexible strip material both to record the total amount of material which has moved over a conveyor for a definite time, and for insuring that the weight per unit of length of the material shall be uniform. Such apparatus is particularly useful in the making of rubber articles, such as tube or tread stocks. These stocks are calendered or forced from dies and run directly onto a conveyor wherein a scale is situated. By direct reading of the scale the operator is advised of the weight of the material as it moves along the conveyor and he is able to adjust the calendar or dies to obtain the correct weight of stock per unit of length.

Heretofore such weighing apparatus has comprised a conveyor on which the strip material is moved, while the conveyor and the strip material have moved across an arm or weighing pan of the scale. The reading recorded by the scale was a composite reading indicating the total weights of both the conveyor and the strip material bearing on the scale. As both the weights of the conveyor and strip material vary, the scale reading would not necessarily give a true indication of the weight of the strip material. In order to determine the weight of the strip material, the supposed weight of the conveyor, per unit of length, had to be deducted from the total scale reading either by mentally subtracting from the scale reading or by "loading" the scale to compensate for the supposed weight of the conveyor. Such readings were subject to inaccuracy with the resulting non-uniformity in the strip material passing over the scale.

I provide an apparatus for continuously weighing a strip of moving material in which the conveyor is by-passed around the scale while the strip material passes directly over and bears upon the scale. The length of the by-passed portion of the conveyor is such that the strip material spans a distance sufficient so that the scale substantially wholly supports the strip material bearing thereon at any time. The scale arm is preferably slightly raised above the plane of the adjacent conveyor sections or runways so that the portion of the strip material being weighed is not depending from the adjacent conveyor runways. To eliminate a friction load on the scale, the scale arm terminates in a plurality of rollers which engage and support the strip material.

The single figure of the accompanying drawing is a perspective view of a weighing device embodying my invention, the end portions of the conveyor being broken away.

Referring to the drawing, a continuous weighing device comprises a belt conveyor 1 which is supported on runways 2 and 3 at opposite sides of a scale 4. The runways 2 and 3 are spaced far enough from the scale 4 so that a strip of flexible material 5, examples of which may be rubber tubing or rubber tread stock, spanning the distance between the runways and bearing on the scale 4 are substantially wholly supported by the latter. The conveyor 1 is by-passed around the scale by a plurality of rollers 6, 7, 8 and 9. The rollers 6 and 9 are mounted by bearings 10 on structural members 11 comprising a portion of the frame of the weighing device. The rollers 7 and 8 are similarly supported on structural members 12 disposed beneath the members 10. The frame members 11 and 12 are supported by posts 14. The conveyor 1 may be driven by any suitable form of mechanism, not shown.

The scale 4 is supported by cross members 15 fastened between the frame members 12. A base 16 of the scale 4 is slidable on the cross pieces 15 and houses most of the scale operating mechanism. A post or weighing arm 17 extends upwardly from the base 16 and terminates in a frame 18. A plurality of rollers 19 are mounted in the frame 18 with their axes at substantially right angles to the direction of movement of the strip 5 so that friction between the strip 5 and the scale 4 is reduced to a minimum. The presence of an appreciable amount of friction between the scale 4 and strip 5 would affect the reading of the former.

The scale 4 is provided with a pointer 20 co-operating with an index 21. The scale may also be provided with a pan 22 for supporting a counterweight 24, if desired. It is to be understood that the details of the scale 4 may be varied as desired. If the direct weight of the strip bearing on the scale is desired, the counterweight 24 is not needed. However, if it is desired to note the deviation in the weight of the strip from a standard or predetermined value, the counterweight 24 may be used to maintain the standard weight as indicated by the reading of the pointer 20 on the index 21.

It is to be understood that the detail showing of the scale herein described is by way of example and not as a limitation of the type of scale which may be used in the apparatus.

For supporting a return run 25 of the conveyor, a plurality of rollers 26 are mounted on the posts 14 below the members 12.

In the operation of the apparatus, the strip material 5 may be assumed as moving from the left to the right of the figure on the conveyor which in turn is resting on the runway 3. As the conveyor passes around the roller 6 the strip material is separated from it. The conveyor passes downwardly around the roller 7 across to the roller 8, upwardly and around the roller 9 to rest on the runway 2. The strip material 5 spans the spaces between the rollers 6 and 19, and 19 and 9. These spaces are made sufficiently long so that the material bearing on the rollers 19 is substantially wholly supported thereby.

Any variation in the weight of the strip material per unit of length is indicated by a variation in the reading of the pointer 20 on the index 21. An operator may then adjust calendar rollers or dies, or the like, not shown, which are forming the strip in order to bring the strip back to the proper standard. Preferably the rollers 19 are raised slightly above the runways 2 and 3 to insure that the material bearing on the scale is not being supported in part by the tension in the strip. The separation of the conveyor 1 from the strip 5, as the latter passes over the scale 4, eliminates all influence of the weight of the conveyor on the scale reading which has existed in prior art devices.

While I have shown and described a present preferred embodiment of my invention, it is to be understood that it may be otherwise embodied within the spirit of the invention and the scope of the appended claims.

Having thus described my invention, what I claim and desire to protect by Letters Patent is:

1. A weighing device comprising a scale, and horizontally aligned conveying means disposed at the sides of the scale and separated therefrom by a substantial distance whereby strip material passing over the scale between said conveying means is substantially wholly supported by said scale.

2. A weighing device comprising a frame, a conveyor for moving strip material, a scale mounted on the frame, and means for by-passing the conveyor around the scale whereby the strip material being transported by the conveyor spans and bears upon the scale.

3. A weighing device comprising a frame, a conveyor for moving strip material, a scale mounted on the frame, and rollers mounted on the frame for by-passing the conveyor around the scale whereby the strip material being transported by the conveyor spans and bears upon the scale.

4. A weighing device comprising a frame having separated runways in substantial alinement, a conveyor traversing said runways, a scale disposed between said runways, and means for by-passing the conveyor around said scale between said runways whereby strip material carried by the conveyor spans the space between the runways and bears on said scale.

5. A weighing device comprising a frame having separated runways in substantial alinement, a conveyor traversing said runways, a scale disposed between said runways, and a plurality of rollers supported on the frame for engaging and by-passing the conveyor around the scale whereby strip material carried by the conveyor spans the space between the runways and bears on said scale.

6. A weighing device comprising a scale, horizontally aligned supports for a conveyor at the opposite sides of the scale, a material conveyor movable on said supports, and means for by-passing said conveyor around said scale while material moved by said conveyor traverses and bears upon said scale.

Signed at Indianapolis, county of Marion, State of Indiana, this 24th day of April, 1930.

JOHN E. CADY.